Aug. 15, 1961    L. D. WALTER    2,996,055
AUTOMATIC LOW OIL PRESSURE CONTROL FOR ENGINES
Filed Aug. 25, 1959    2 Sheets-Sheet 1
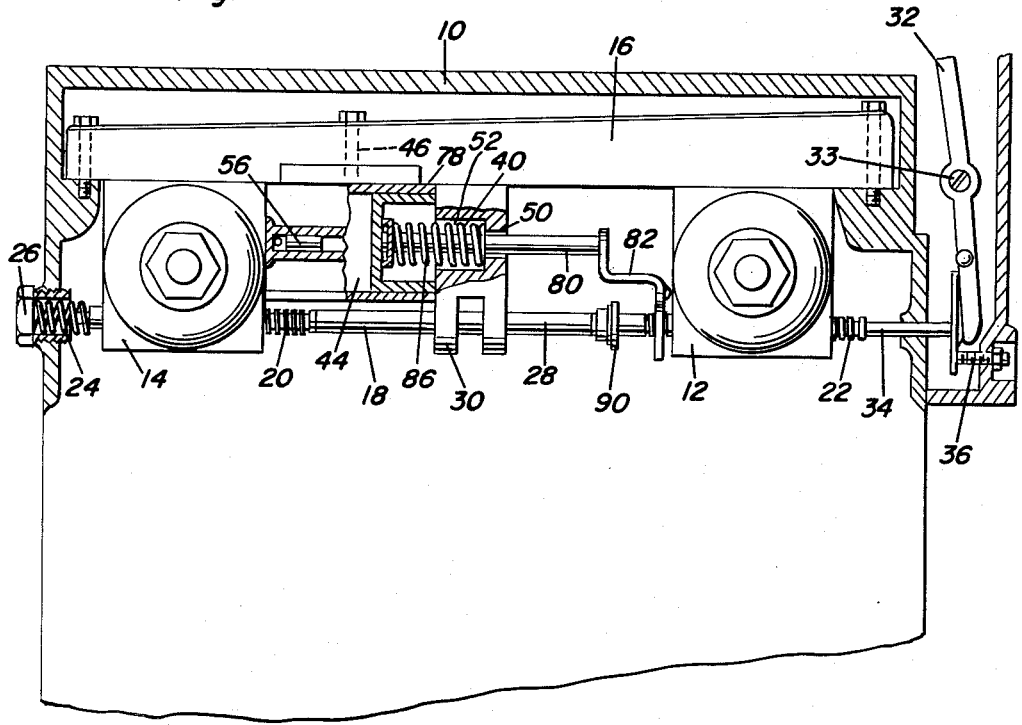
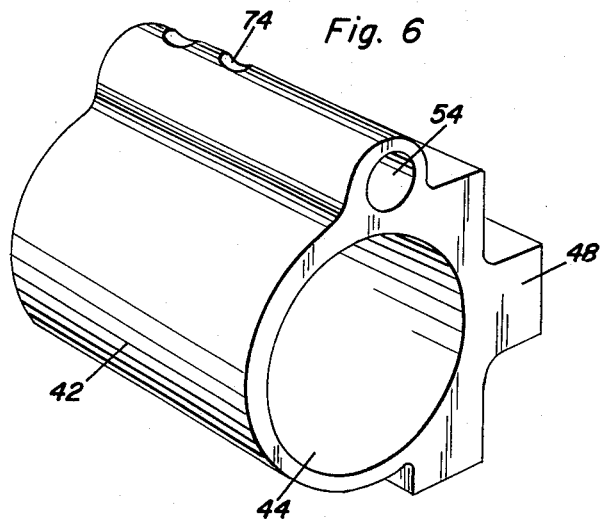
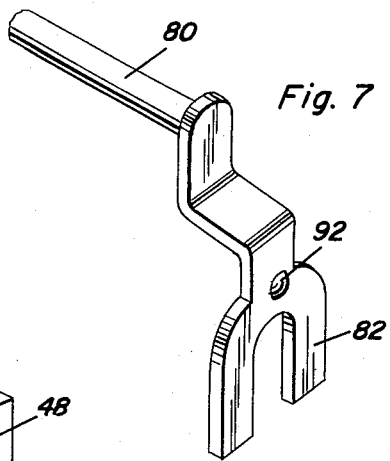
Lyle D. Walter
INVENTOR.
BY *Clarence A. O'Brien*
*and Harvey B. Jacobson*
Attorneys Aug. 15, 1961    L. D. WALTER    2,996,055
AUTOMATIC LOW OIL PRESSURE CONTROL FOR ENGINES
Filed Aug. 25, 1959    2 Sheets-Sheet 2
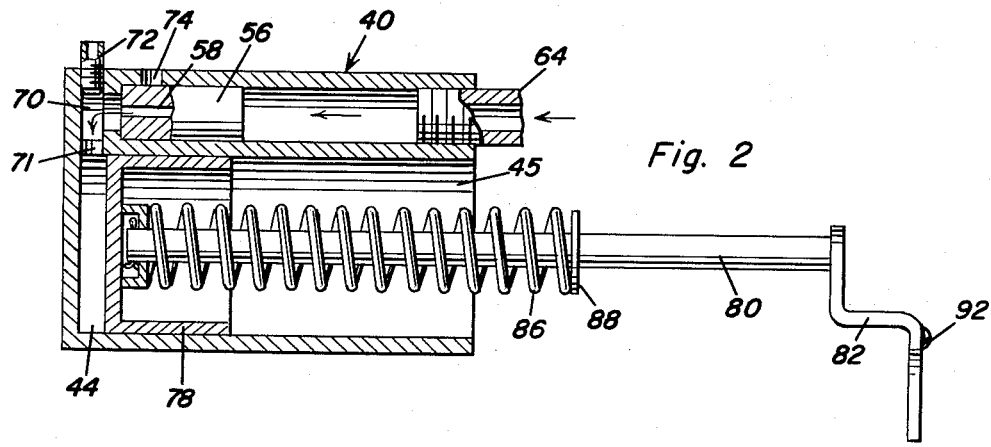
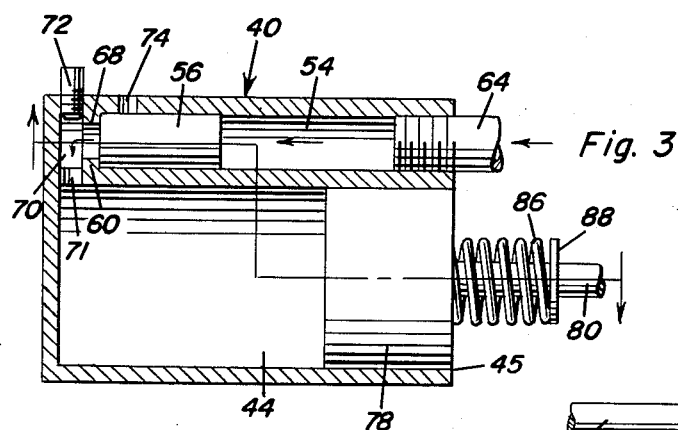
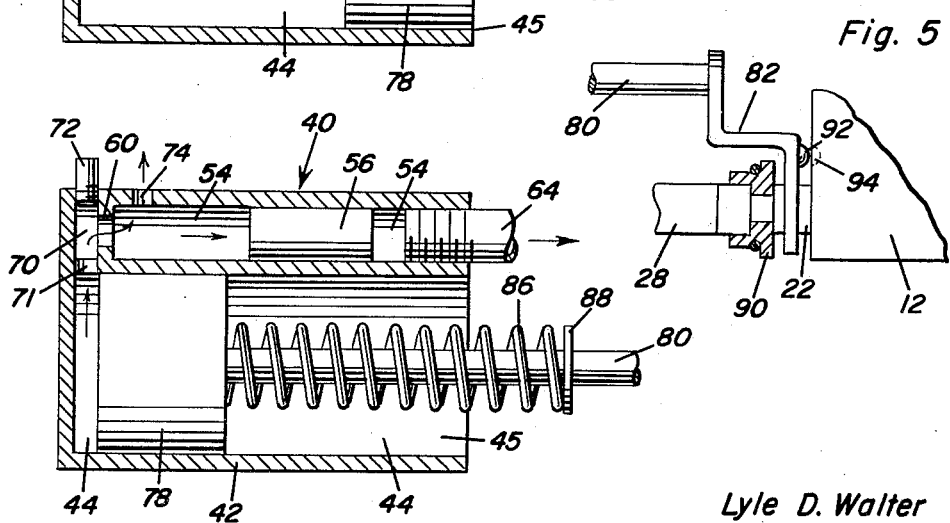
Lyle D. Walter
INVENTOR.

United States Patent Office 2,996,055
Patented Aug. 15, 1961

2,996,055
AUTOMATIC LOW OIL PRESSURE CONTROL
FOR ENGINES
Lyle D. Walter, Casselton, N. Dak.
Filed Aug. 25, 1959, Ser. No. 835,876
14 Claims. (Cl. 123—139)

This invention relates to internal combustion engines and more particularly to an attachment to prevent internal combustion engines from operating under little or no oil pressure conditions.

A problem existing in some commercially available diesel engines is that of bearing failure due to lack of lubrication under a starting condition at which the engine is started in a direction opposite to that for which the engine was designed. Inasmuch as the oil pump will not provide lubricant under pressure when operating in the incorrect direction of rotation, premature wear and failure of bearings has been the experience.

Further, when there is a lack of oil pressure for any reason and occasioned by any mechanical failure, a similar bearing failure or premature wear can result.

An object of the invention is to provide an attachment for an internal combustion engine of the type which uses fuel injection, which prevents the engine from operating when the oil pressure is low or at a zero level thereby avoiding the above mentioned bearing failures.

A further object of the invention is to provide an attachment as discussed above and wherein the attachment will enable pressure to build up properly during engine cranking operations preparatory to starting, after which the attachment will permit the engine to start provided that oil pressure is built up during these initial cranking movements in the engine.

A few of the advantages of the invention are that the attachment will not permit the engine to run backwards as sometimes happens in diesel engines which are not equipped with non-reversing cam shafts; it will prevent the engine from starting at a no oil pressure condition; it will not allow fuel to be injected into the cylinders with the speed control lever ahead until the oil pressure is built up. This helps to prevent flooding during starting and is particularly helpful to those who do not understand the correct and manufacturers' suggested way of starting the engine. The attachment will immediately stop the engine if for any reason whatsoever the oil pressure should fail due to breakage of a line or some other cause of sudden oil pressure loss; the attachment will prevent the engine from being pulled under a fuel rack setting, due to very low oil pressure; and the attachment will compel the operator to turn over the engine for a longer period prior to starting to assure proper lubrication before the engine actually fires.

Although the accompanying drawings show a fragmentary portion of one particular type of diesel engine, by very minor adjustment for size and conformity, the attachment may be applied to other manufacturers' makes of diesel engines.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary sectional view of a diesel engine showing some of the conventional parts and showing in section and partially in elevation, the attachment applied thereto;

FIGURE 2 is a sectional view showing the attachment in a position at which the parts will appear when pressure commences to build up;

FIGURE 3 is a sectional view similar to FIGURE 2 but showing the position of the parts of the attachment during a normal pressure condition within the engine;

FIGURE 4 is a sectional view showing the adjustment of parts in the attachment as they would appear when the pressure stops;

FIGURE 5 is a fragmentary sectional view showing a fork and stop related to each other and the housing of one of the fuel pumps together with a part of the fuel injector pump operating rack assembly;

FIGURE 6 is a perspective view of the attachment body; and,

FIGURE 7 is a fragmentary perspective view of a fork and piston rod constituting part of the attachment.

In the accompanying drawings reference is first made to FIGURE 1 which shows a number of conventional parts of a conventional diesel engine. Among these are the cylinder block 10, a first injection pump 12, a second injection pump 14 and an injection pump bracket 16. Rack assembly 18 is arranged to actuate the first and second injection pumps 12 and 14 by longitudinal axial movement of the racks 20 and 22 thereof. Rack assembly spring 24 reacts on one end of rack 20 and is seated in a cup nut 26 threaded into the cylinder block. An intermediate, and usually adjustable shaft 28 is attached at its ends to the two racks 20 and 22 and is supported intermediate its ends by means of bearing bracket 30 ordinarily made as a casting and as a part of injection pump bracket 12. Governor arm 32 is pivoted on eccentric screw 33, and one end thereof is in contact with the end part 34 of rack assembly 18, and the functioning of the governor arm is controlled as an adjustment of rack adjusting screw 36 in contact with a portion of the governor arm 32. All of the above briefly discussed structure is conventional and commercially available as a part of at least one type of diesel engine.

Attachment 40 is mechanically associated with this structure to achieve the ends that have been previously briefly mentioned. The attachment includes a body 42 mounted between bracket 30 and one of the injector pumps. Body 42 includes the cylinder 44, and the body is attached to the bracket 16 by a single bolt 46 which enters a tapped opening in flange 48 extending axially of cylinder 44 and on the exterior thereof. The length dimension of the body 42 can be made to fit so that the ends thereof contact one of the injector pumps, for instance pump 14, and bracket 30, respectively, which is preferably bored as at 50 and counterbored as at 52.

Body 42 has an oil passageway 54 extending parallel to cylinder 44 since this is a convenient orientation for the passageway. A free floating relief and blocking valve 56 is disposed in passageway 54, and it has a pressure reducing orifice or passage 58 extending therethrough. Valve 56 is movable between end wall 60 of passageway 54 and the opposite end of the passageway which has an oil pressure source connected therewith, for instance a tube 64 which is connected suitably in the oil pressure system associated with the engine. One possible point of connection is in the oil pressure gauge line so that gauge pressure exists in passageway 54 at all times on the upstream side of the valve 56.

Aperture 68 in passageway wall 60 registers the passageway with a lateral passage 70, the purpose of which is to intercommunicate the downstream side of valve 56 in passageway 54 with cylinder 44. The plug 72 in passage 70 is merely to close the opening which is made during drilling passage 70. Relief port 74 is in the side wall of passageway 54 and is controlled by valve 56.

Piston 78 is mounted for reciprocatory movement in cylinder 44. The piston has a piston rod 80 secured to it and extending through the open end 45 of cylinder 44. Fork 82 is secured to the outer end of piston rod 80 and the fork straddles a part of the rack assembly 18 (FIGS. 1 and 5). Spring 86 is concentric on piston rod 80 and has one end seated on a collar 88 slidable on the piston rod. The other end seats on piston 78. The spring 86 and collar 88, when used, are disposed in the counterbore 52 (FIG. 1) so that one end of the spring has a stationary reactant. The piston rod 80 extends through the bore 50 and the counterbore so that the fork 82 can be positioned as aforesaid.

A stop 90 is mounted on the adjustable shaft 28 and is thus connected to rack 22 of assembly 18, and fork 82 cooperates with the stop to move the rack assembly 18 as will be described in more detail subsequently. A small lug or projection 92 rises from one surface of fork 82 and is adapted to seat in a small recess 94, see FIGURE 5, formed in the side of the housing of the injector pump 12 thereby preventing the fork from rubbing against the rack assembly during normal operation and also centering the fork 82.

The use and operation is as follows: Oil under pressure enters passageway 54 by way of tube 64. As the diesel engine is cranked by the starting engine or motor the condition of parts in the attachment 40 are as shown in FIGURE 2. Oil pressure is applied to one face of valve 56, moving the valve to the position shown in FIGURE 2 at which the relief port or ports 74 are covered, and oil passes through orifice 58, passage 70, the port or ports 71 registering the passage 70 with cylinder 44, and then the cylinder 44 on one side of piston 78 therein.

As the piston 78 moves outwardly of cylinder 44, piston rod 80 and fork 82 thereon moves in a direction parallel to rack assembly 18 until they occupy a position at which the projection 92 seats in recess 94 in the injector pump 12. This position is shown in FIGURES 1 and 3. From inspection of FIGURE 1 it is seen that fork 82 is separated from stop 90 so that the fork does not in any way interfere with the normal operation of the rack assembly 18. The time lag between initial cranking of the diesel engine and the movement of fork 82 caused by pressure built up in cylinder 44 is sufficient to cause proper oil pressure built up in the bearings of the engine.

If the engine is not started properly, or if the engine is pulled down to a very low r.p.m. while operating under a heavy load, and then releasing the clutch, the diesel engine under consideration will often run backwards. When this occurs the oil pressure is reduced to zero because the oil pump will operate backwards. In the oil pressure system of the engine, there will be a corresponding zero pressure in cylinder 44 enabling spring 86 to push the piston back into cylinder 44 as shown in FIGURE 4. The oil in the cylinder 44 will return backward as shown by the arrows in FIGURE 4, through passage 70 and into passageway 54 but on the downstream side of valve 56 causing it to move in a direction to uncover relief port 74.

Further, when the piston 78 is returned inwardly of cylinder 44, fork 82 engages stop 90 and pulls it in a direction to move rack assembly 18 to the "off" position and this prevents the engine from running due to the incapacitating of injector pumps 12 and 14. Attachment 40 will remain in this position (FIG. 4) until such time as a correction in the oil pressure system is made, either by repair or by a proper starting procedure for the engine, at which it is automatically (by proper pressure application) restored to the operating condition (FIG. 3).

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an internal combustion engine, a plurality of fuel injection pumps disposed in spaced parallel relation and each having a transversely slidable adjusting rod with said rods being disposed in endwise abutting alignment for simultaneous operation, operating mechanism connected to one end of the series of aligned adjusting rods for controlling the delivery of said fuel pumps, a source for supplying lubricant under pressure to said engine, an attachment connected to said source and to said operating mechanism and preventing operation of said pumps when said source is below a predetermined minimum pressure, said attachment comprising a fluid motor mounted between a pair of said pumps and disposed between said adjusting rods and said engine means connecting said fluid motor to one of said adjusting rods for effecting actuation of said series of adjusting rods by said motor, passage means connecting said fluid motor to said source for moving said adjusting rods in a direction to allow operation of said injection pumps and return means connected to said fluid motor for moving said adjusting rods in a direction to discontinue operation of said fuel pumps.

2. The combination of claim 1 including a stop on one of said adjusting rods, said connecting means comprising a fork loosely slidable axially upon an adjusting rod and engageable with said stop for actuating the latter in said last mentioned direction, said fork being connected to said fluid motor.

3. The combination of claim 2 wherein said fork and an adjacent housing of an injection pump have cooperating abutment means limiting movement of said fork in said first mentioned direction.

4. The combination of claim 3 wherein said cooperating means comprise a projecting detent and said fork and a complementary recess in said housing.

5. The combination of claim 1 wherein said fuel pump has a cylinder with a piston reciprocable therein and forming a part of said connecting means, said passage means including a lubricant pressure passageway formed in said fluid pump, a valve slidable in said passageway, said passageway having a relief port controlled by said valve.

6. The combination of claim 5 including a restricted constant leak passage through said valve.

7. The combination of claim 6 wherein said relief port communicates with said engine.

8. The combination of claim 1 wherein said fuel pump has a cylinder with a piston reciprocable therein and forming a part of said connecting means, said passage means including a lubricant pressure passageway formed in said fuel pump, a valve slidable in said passageway, said passageway having a relief port controlled by said valve, a stop on one of said adjusting rods, said connecting means comprising a fork loosely slidable axially upon an adjusting rod and engageable with said stop for actuating the latter in said last mentioned direction, said fork being connected to said fluid motor.

9. The combination of claim 8 wherein said fork and an adjacent housing of an injection pump have cooperating abutment means limiting movement of said fork in said first mentioned direction.

10. The combination of claim 9 wherein said cooperating means comprise a projecting detent and said fork and a complementary recess in said housing.

11. The combination of claim 1 wherein said fuel pump has a cylinder with a piston reciprocable therein and forming a part of said connecting means, said passage means including a lubricant pressure passageway formed in said fuel pump, a valve slidable in said passageway, said passageway having a relief port controlled by said valve, said return means comprising a spring engaging said piston and disposed within said cylinder and reacting against a stationary abutment carried by said engine.

12. The combination of claim 1 wherein one of said adjusting rods is slidably journaled in said support means.

13. The combination of claim 1 wherein said fluid motor includes a cylinder and piston unit with said piston having a piston rod comprising a part of said connecting means, said support means having a bore therethrough receiving said piston rod, said cylinder being mounted upon said support means and surrounding said bore.

14. The combination of claim 13 wherein said bore has a counterbore, said return means comprising a spring seated in said counterbore and engaging said piston.

References Cited in the file of this patent

UNITED STATES PATENTS

| | | |
|---|---|---|
| 2,566,083 | Endsley et al. | Aug. 28, 1951 |
| 2,645,474 | Barnes | July 14, 1953 |
| 2,719,521 | King et al. | Oct. 4, 1955 |